(12) United States Patent
Seo

(10) Patent No.: US 6,414,915 B2
(45) Date of Patent: Jul. 2, 2002

(54) METHOD OF DETERMINING A DISTANCE TO BE MOVED BY AN OPTICAL PICK-UP

(75) Inventor: Jee-Won Seo, Pyeongtaek (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/739,683

(22) Filed: Dec. 20, 2000

Related U.S. Application Data

(62) Division of application No. 09/167,483, filed on Oct. 7, 1998.

(30) Foreign Application Priority Data

Nov. 27, 1997 (KR) ............................................. 97-63608

(51) Int. Cl.⁷ ............................................. G11B 17/22
(52) U.S. Cl. ..................................... 369/30.1; 369/53.2
(58) Field of Search ........................... 369/32, 33, 53.2, 369/53.41, 53.21, 53.22

(56) References Cited

U.S. PATENT DOCUMENTS

| | | | | |
|---|---|---|---|---|
| 4,631,606 A | * | 12/1986 | Sugaya | 360/77.08 |
| 4,701,897 A | * | 10/1987 | Nakagawa | 369/32 |
| 4,736,352 A | * | 4/1988 | Satoh et al. | 369/32 |
| 5,166,915 A | * | 11/1992 | Fuldner et al. | 369/44.28 |
| 5,202,864 A | * | 4/1993 | Moriya et al. | 369/32 |
| 5,210,726 A | * | 5/1993 | Jackson et al. | 369/32 |
| 5,241,522 A | * | 8/1993 | Yanagi | 369/32 |
| 5,247,499 A | * | 9/1993 | Hayashi et al. | 369/32 |
| 5,257,250 A | * | 10/1993 | Moriya et al. | 369/44.25 |
| 5,566,141 A | * | 10/1996 | Yamaguchi et al. | 369/32 |
| 5,590,101 A | * | 12/1996 | Itoi | 369/32 |
| 5,646,916 A | * | 7/1997 | Kobayashi | 369/32 |
| 5,808,982 A | * | 9/1998 | Yun | 369/32 |
| 6,215,739 B1 | * | 4/2001 | Adaghi et al. | 369/44.28 |

* cited by examiner

Primary Examiner—Tan Dinh
(74) Attorney, Agent, or Firm—Birch, Stewart, Kolasch & Birch, LLP

(57) ABSTRACT

The present invention provides a method of determining a distance for moving an optical pick-up from a current track to a target track based on a distance from an exact single track width formed on an optical disc. According to the present invention, a method of determining a single track width of an optical disc by an optical pick-up includes the steps of a) calculating a number of tracks crossed by the pick-up using a detection of an initial track position information of an initial track when performing an initial loading of the disc, and track position information of a predetermined track located away the predetermined distance form the initial track; and b) calculating a single track width depending on the predetermined distance and the calculated number of tracks to be crossed by the pick-up. In the present invention, the access time of various optical discs is identical regardless of the size of a single track width of an optical disc.

13 Claims, 3 Drawing Sheets

METHOD OF DETERMINING A DISTANCE TO BE MOVED BY AN OPTICAL PICK-UP

This application is a divisional of application Ser. No. 09/167,483, filed on Oct. 7, 1998, the entire contents of which are hereby incorporated by reference.

BACKGROUND OF THE INVENTION

1. Field of the Invention

The present invention relates to a method of determining a distance to be moved by an optical pick-up, where a distance from a current track to a target track is determined by an exact single track width formed on an optical disc. More specifically, the present invention relates to a method of determining a distance to be moved by an optical pick-up to achieve uniform access time for various optical discs, regardless of differences in size of the single track width formed on those optical discs.

2. Description of the Related Art

FIG. 1 shows the structure of a conventional drive/detection unit which drives the optical disc and detects signals therefrom. A pick-up 11 reads recording signals that are detected based on light which is incident upon, and is reflected from, the surface of an optical disc 10. A sled motor 12a moves the pick-up 11 in a radial direction across the disc 10. A spindle motor 12b rotates the disc 10. A driver 30 drives both the sled motor 12a and the spindle motor 12b. An R/F unit 20 filters and normalizes the signals detected by the pick-up 11. A servo unit 40 receives focus error signals (FES) and tracking error signals (TES) output from the pick-up 11, and controls the rotation rate of the spindle motor being driven by the driver 30. The servo unit 40 also detects synchronization of the output signal from the R/F unit 20. A digital signal processor (DSP) 50 recovers the signal read by the R/F unit 20 into an original digital signal, using the detected synchronization. A microprocessor 60 controls the movement of the pick-up 11, and thus the play of the disc 10.

The pick-up 11 moves in a radial direction across the disc 10 during the play thereof and continuously detects the R/F signals recorded thereon. The R/F unit 20 filters and normalizes the R/F signals detected by the pick-up 11. The servo unit 40 detects synchronization of the filtered and normalized signals. The DSP 50 recovers the R/F signals output from the R/F unit 20 into original digital data, using the detected synchronization, the data ultimately being converted into moving picture data.

When a user directs the microprocessor 60 to perform a search mode (i.e., requests play of a target track located away from the track being currently read by the pick-up 11), the microprocessor 60 detects the current position information of the pick-up 11 from digital data, which is play information input from the DSP 50, and detects the number of the current track corresponding to the position information. The position information may be minute, second, and block (MSB) data in the case of CD, while it may be sector numbers in the case of DVD. The number of tracks to be crossed by the pick-up and the direction of movement of the pick-up are then determined, depending on the difference of the track numbers between the current track and the target track.

With this information known, the microprocessor 60 then calculates the distance from the current track to the target track by multiplying the number of tracks to be crossed by a standard single track width of the disc, which is known to those skilled in the art. Once the distance to be moved by the pick-up 11 is calculated, the microprocessor 60 controls the driver 30 via the servo means so that a drive current is output to the sled motor 12a. The sled motor 12a is rotated in proportion to the time of applying the drive current causing the pick-up 11 to move by an exactly calculated distance in the desired direction.

After the pick-up 11 moves the exactly calculated distance, it reads the track information at the moved position and identifies whether the track being read at the moved position is the target track requested by the user. If the track being read at the moved position is not the target track, the pick-up 11 performs a fine search mode. In the fine search mode, pick-up 11 moves to a second position which is located a small distance away from the track being read and reads the track information at the second position. This fine search mode is repeated until the target track is found.

It is well known to those skilled in the art that a standard single track width of an optical disc is generally 1.6 $\mu$m. However, the real single track width formed on the disc may vary depending on the manufacturing conditions, or higher integrity of data thereof. That is, tracks formed on the optical disc do not have a single uniform track width. In reality, a single track width of the optical disc having a range of 1.5 to 1.7 $\mu$m is acceptable, and thus the real tracks of the optical disc are formed within this range. Nonetheless, when the microprocessor 60 calculates a distance to be moved by the pick-up 11, the microprocessor 60 always identifies the single track width of the disc to be 1.6 $\mu$m.

As a result, if the real single track width formed on the disc is less than 1.6 $\mu$m, the pick-up 11 may overshoot the target track during a search mode. On the other hand, if the real single track width formed on the disc is more than 1.6 $\mu$m, the pick-up 11 may overshoot the target track during a search mode. In those cases, additional time is needed for performing a fine search mode (e.g., 150 to 200 msec.) In some cases, additional time up to 2 to 3 sec is needed. This results in a much longer time for accessing a desired target track.

SUMMARY OF THE INVENTION

An object of the present invention is to provide a method of determining an exact single track width of an optical disc by an optical pick up without the above and other drawbacks of conventional systems.

Another object of the present invention is to provide a method of determining the exact distance to be moved by an optical pick-up from one track to another track on an optical disc, where the time required to access a target track is not affected by the real single track width formed on the disc.

According to one aspect of the present invention, a method of determining a single track width of an optical disc by an optical pickup includes calculating a number of tracks crossed by the optical pick-up based on a detection of initial track position information corresponding to a track position at an initial loading of the disc, and track position information corresponding to a track located a predetermined distance away from the track position at the initial loading of the disk, and calculating a single track width based on the predetermined distance and the calculated number of tracks crossed by the optical pick-up.

According to another aspect of the present invention, a method of determining a distance for moving an optical pick-up from a first track to a second track on an optical disc includes determining a width corresponding to a track on a disc, and determining a distance to be moved by the pick-up from a current track to a target track when the microprocessor detects a search mode of a target track during playback of the disc, the distance being determined based on the determined width.

According to yet another aspect of the present invention, a method of determining a type of a disc includes determining a width corresponding to a track on a disk, and determining the type of the disc based on the determined width, when access of the disc is requested. To determine the width, this method includes calculating a number of tracks crossed by a pick-up from an initial track to a predetermined track, based on detection of initial track position information corresponding to a track position at initial loading of the disc, and track position information corresponding to a track located a predetermined distance away from the track position at the initial loading of the disk, and calculating a single track width based on the predetermined distance and the calculated number of tracks crossed by the pick-up.

In each of these aspects of the method, the position information of tracks may be at least one of an MSB information, and a sector number in the disc. Furthermore, the initial track may be a track having an inner diameter, and the track located a predetermined distance from the initial track may be a track having an outer diameter. Still further, the methods may include driving the pick-up using a step motor driven by a certain number of pulses output by a driver.

Further scope of applicability of the present invention will become apparent from the detailed description given hereinafter. However, it should be understood that the detailed description and specific examples, while indicating preferred embodiments of the invention, are given by way of example only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
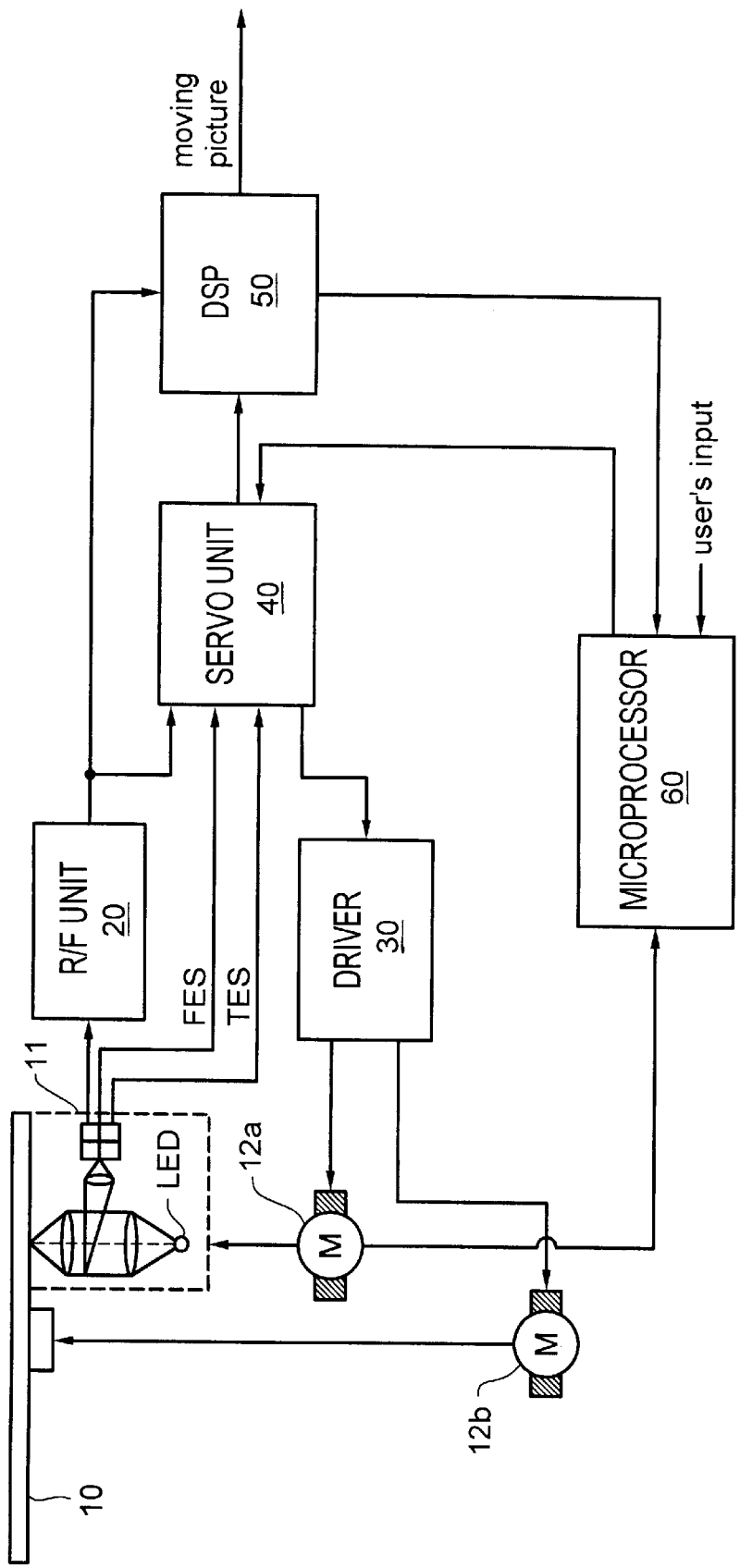
FIG. 1 is an example of the structure of a conventional drive/detection unit of an optical disc playing device.

With reference to the accompanying drawings, a preferred embodiment of this invention will be described.

In the drawings, like reference numerals represent like elements and processes, and redundant description is omitted for brevity.

As previously indicated, FIG. 1 illustrates general components of a conventional system including a drive/detection unit, and a preferred embodiment of the present invention includes the same general components. However, in a preferred embodiment, the sled motor 12a may include a step motor for determining the movement distance of pick-up 11 more precisely. The driver 30 may also include a pulse-drive circuit.

Figure 3:
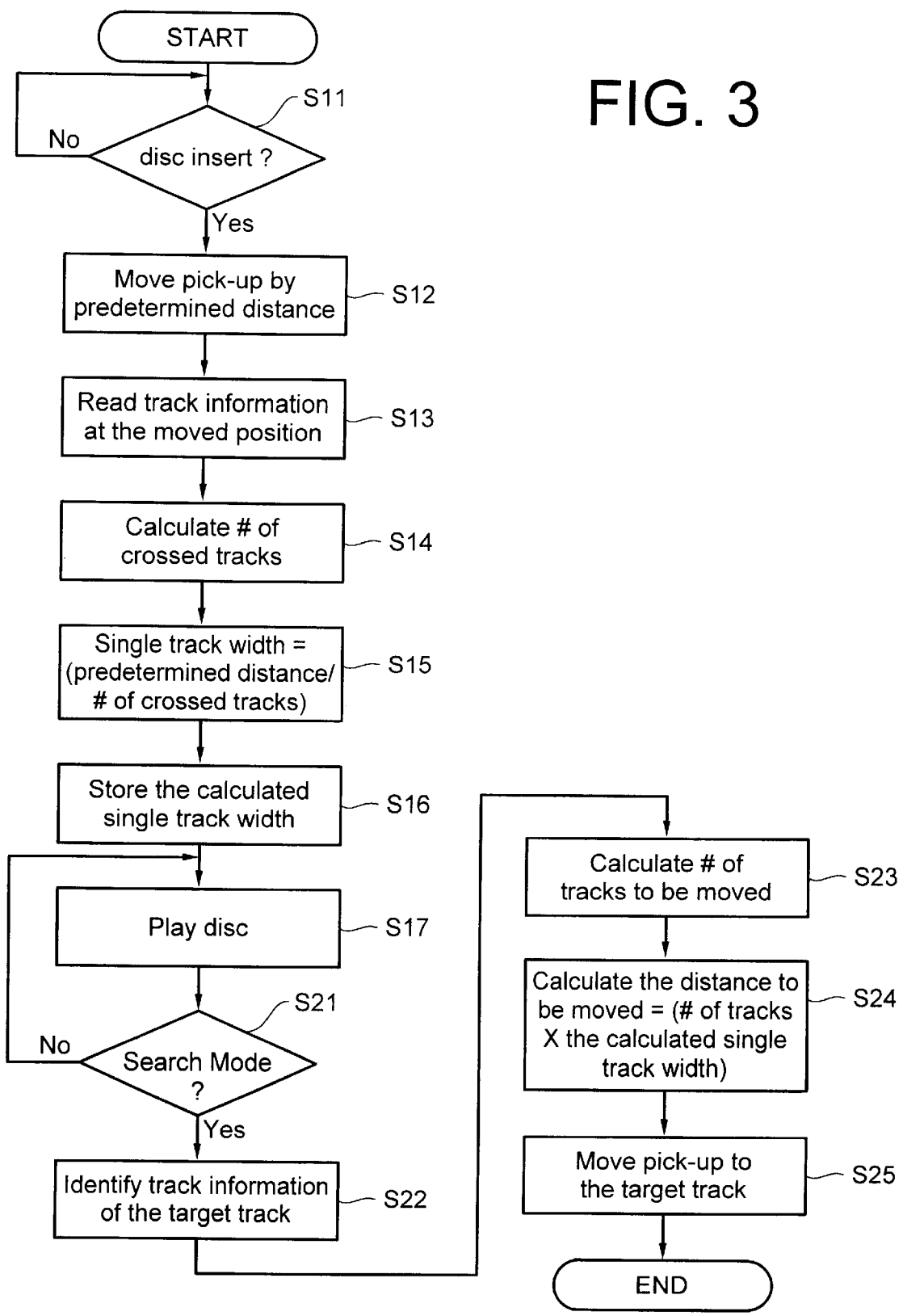
FIG. 3 is a flow chart of an exemplary method for determining a distance for moving an optical pick-up, in accordance with the present invention.

FIG. 3 shows a flow chart of an exemplary method for determining a distance for moving an optical pick-up. A more detailed description is described below.

Now referring to FIGS. 1 and 3, if an optical disc 10 is inserted (S11), the microprocessor 60 drives the sled motor 12a by applying a predetermined number of pulses via the driver 30 and the servo unit 40, causing the pick-up 11 to be moved a predetermined distance from an initial position from which the play control information is read (S12). The distance in which the pick-up 11 is moved is precisely controlled by the sled motor 12a.

Then, the pick-up 11 detects signals recorded on the disc 10 at the moved-to position. The detected signal is transferred, via the R/F unit 20, the servo unit 40 and the DSP 50, in sequence, to the microprocessor 60. The detected signal is a digital signal containing play control information (sub-Q field). The microprocessor 60 detects track information (e.g., MSB information) in the moved position from the transferred play control information (S13), and calculates the corresponding track number in the moved position. Then, the number of crossed tracks between the initial position (track number 0 or 1) and the moved-to position can be obtained based upon the track number in between (S14).

Thereafter, the microprocessor 60 calculates a single track width by dividing the predetermined distance by the number of the crossed tracks (S15) and stores the result (S16). When the request for a search mode is received by the microprocessor 60 from a user during a sequential playback of the disc 10 (S17 and S21), then the microprocessor 60 identifies MSB information of a target track from play control information, as described above, and obtains the number of the target track corresponding to the identified MSB information (S22). Then the microprocessor 60 calculates the number of tracks to be moved by the pick-up 11 based upon the difference between the track numbers of the current playing track and the target track (S23). Finally, the distance for moving the pick-up 11 from the current track to the target track is determined by multiplying the obtained number of tracks to be moved by the pick-up 11 by the previously stored single track width (S24).

Once the distance to be moved by the pick-up 11 is determined, the microprocessor 60 drives the sled motor 12a using pulses from the driver 30 and moves the pick-up 11 to the target track (S25). Then the pick-up enters into a fine search mode, and moves exactly to the target track.

Figure 2:
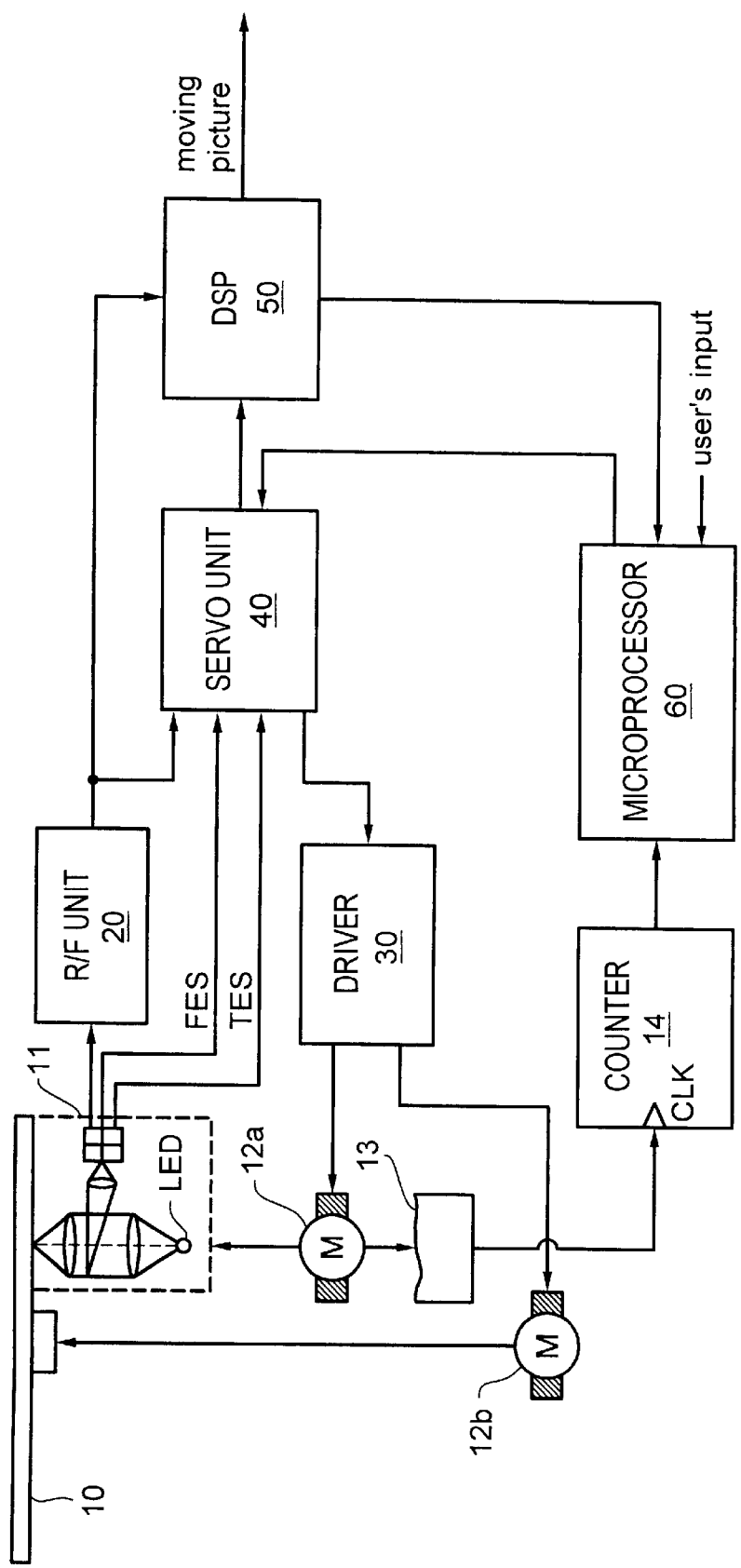
FIG. 2 is an example of the structure of a drive/detection unit of an optical disk playing device which is used for determining a distance to be moved by an optical pick-up, in accordance with the present invention.

FIG. 2 shows an embodiment of the present invention which is used for determining a distance to be moved by the pick-up 11. In FIG. 2, for the sled motor 12a, a DC motor is used instead of a step motor. In addition, a Hall sensor 13 may be used for detecting the rotation number of the DC motor, and a counter 14 may be used for counting the output pulses from the Hall sensor 13. If the DC motor is used as the sled motor 12a, and a Hall sensor 13 is used for detecting motor rotation, the DC motor may be rotated with less precision when compared with that of a step motor. More specifically, the Hall sensor 13 detects the amount of rotation of the DC motor and sends the result to the microprocessor 60. Then the microprocessor 60 continuously identifies the distance to be moved by the pick-up 11, and stops the drive operation of the drive 30 when the distance reaches a predetermined value.

However, the number of pulses output from the Hall sensor 13 per revolution of the DC motor is generally not large. Consequently, the resolution for a single pulse is imprecise, particularly since the number of tracks to be moved by the pick-up 11 upon a single pulse could range from approximately 50 to 100 tracks, depending on the type of Hall sensor 13 used. Thus, to achieve a precise calculation for a single track width, the predetermined distance used in step S12 should be made large, the error rate increasing if the number of tracks to be crossed by the pick-up 11 is not sufficiently larger than the 50 to 100 tracks corresponding to a single pulse. As a preferable embodiment, the predetermined distance may be the distance from the inner most radial position to the outermost radial position of the disc so as to minimize the error rate occurring when determining the distance to be moved by the pick-up 11.

The method used by the present invention to determine the distance for moving the pick-up can be performed regardless of the real single track width which may vary depending on the manufacturing condition or data integrity of the disc. That is, one of the principles of the present invention is that the microprocessor 60 can calculate the real single track width of the disc and determine the distance to be moved by the pick-up 11 based on that width. Thus, even if a disc has a single track width that is different from the standard single track width, the access time for each track can be the same, enabling a reduction in the total access time.

Furthermore, since the width of a single track of any recording medium is expected to decrease in the future in order to increase the data. storage capacity, the present invention enables compatibility with future recording mediums. Still further, by using the single track width determined by the present invention, it is easy to determine the type of recording medium being used. For instance, if different medium types characteristically have tracks of differing widths, the above-described method of detecting track width could be used to determine medium type, e.g., through a simple comparison with known medium widths stored in a look-up table or the like.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention, without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What is claimed is:

1. A method of determining a distance to be moved by an optical pick-up, comprising:
    calculating a number of tracks crossed by the optical pick-up based on a detection of initial track position information corresponding to a track position at an initial loading of the disc and track position information corresponding to a track located a predetermined distance away from the track position at the loading of the disc; and
    calculating a single track width based on the predetermined distance and the calculated number of tracks crossed by the optical pick-up.

2. The method of claim 1, wherein the position information is at least one of an MSB information and a sector number in the disc.

3. The method of claim 1, wherein the track position at the initial loading of the disk a track having an inner diameter of the disk and the track located a predetermined distance away is a track having an outer diameter.

4. The method of claim 1, further comprising driving the pick-up using a step motor which is driven by a certain number of pulses.

5. The method of claim 2, further comprising driving the pick-up using a step motor driven by a certain number of pulses output from a driver.

6. The method of claim 3, further comprising driving the pick-up using a step motor driven by a certain number of pulses output from a driver.

7. A method of determining a type of a disc, comprising:
    determining a width corresponding to a track on a disk; and
    determining the type of the disc based on the determined width when access of the disc is requested.

8. The method of claim 7, wherein determining the width comprises:
    calculating a number of tracks crossed by a pick-up from an initial track to a predetermined track based on a detection of initial track position information corresponding to a track position at an initial loading of the disc and track position information correspond to a track located away a predetermined distance away from the track position at the initial loading of the disk; and
    calculating a single track width based on the predetermined distance and the calculated number of tracks crossed by the pick-up.

9. The method of claim 8, wherein the position information of tracks is at least one of an MSB information and a sector number in the disc.

10. The method of claim 8, wherein the initial track is a track having an inner diameter and the track located a predetermined distance from the initial track is a track having an outer diameter.

11. The method of claim 8, further comprising driving the pick-up using a step motor driven by a certain number of pulses output by a driver.

12. The method of claim 9, further comprising driving the pick-up using a step motor driven by a certain number of pulses output by a driver.

13. The method of claim 10, further comprising driving the pick-up using a step motor driven by a certain number of pulses output by a driver.

* * * * *